United States Patent
Narayanan et al.

(10) Patent No.: US 10,026,041 B2
(45) Date of Patent: Jul. 17, 2018

(54) INTEROPERABLE MACHINE LEARNING PLATFORM

(71) Applicant: Microsoft Technology Licensing, LLC, Redmond, WA (US)

(72) Inventors: Vijay Narayanan, Mountain View, CA (US); Sudarshan Raghunathan, Cambridge, MA (US); Akshaya Annavajhala, Boxborough, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 442 days.

(21) Appl. No.: 14/576,249

(22) Filed: Dec. 19, 2014

(65) Prior Publication Data

US 2016/0012350 A1 Jan. 14, 2016

Related U.S. Application Data

(60) Provisional application No. 62/023,835, filed on Jul. 12, 2014.

(51) Int. Cl.
 *G06N 99/00* (2010.01)
 *G06F 9/455* (2018.01)
 (Continued)

(52) U.S. Cl.
 CPC .......... *G06N 99/005* (2013.01); *G06F 8/313* (2013.01); *G06F 9/4425* (2013.01);
 (Continued)

(58) Field of Classification Search
 None
 See application file for complete search history.

(56) References Cited

U.S. PATENT DOCUMENTS 7,886,264 B1 * 2/2011 Peyton ............... G06F 8/34
 709/201
8,370,279 B1 2/2013 Lin et al.
 (Continued)

FOREIGN PATENT DOCUMENTS

CN 101782976 A 7/2010
WO 2012103290 A1 8/2012

OTHER PUBLICATIONS

Brownlee, Jason, "Best Programming Language for Machine Learning—Machine Learning Mastery", Retrieved from «http://machinelearningmastery.com/best-programming-language-for-machine-learning/», May 25, 2014.*

(Continued)

*Primary Examiner* — Alan Chen
(74) *Attorney, Agent, or Firm* — David Chin; Chin IP, PLLC (57) ABSTRACT

An interoperable platform that provides a way to automatically compose and execute even complex workflows without writing code is described. A set of pre-built functional building blocks can be provided. The building blocks perform data transformation and machine learning functions. The functional blocks have few well known plug types. The building blocks can be composed to build complex compositions. Interoperability between data formats, metadata schema and interfaces to machine learning (ML) functions and trained machine learning models can be provided with no loss of information. A cloud runtime environment can be provided in which the composed workflows can be hosted as REST API to run in production.

20 Claims, 4 Drawing Sheets

(51) Int. Cl.
 *G06F 9/448* (2018.01)
 *G06F 8/30* (2018.01)
 *G06F 9/44* (2018.01)
 *G06F 9/445* (2018.01)
 *G06F 9/54* (2006.01)

(52) U.S. Cl.
 CPC ........ *G06F 9/4484* (2018.02); *G06F 9/44526* (2013.01); *G06F 9/4552* (2013.01); *G06F 9/541* (2013.01)

(56) References Cited

U.S. PATENT DOCUMENTS

| | | | |
|---|---|---|---|
| 8,417,715 B1 | 4/2013 | Bruckhaus et al. | |
| 8,429,103 B1 | 4/2013 | Aradhye et al. | |
| 8,561,086 B2 | 10/2013 | Fleming | |
| 8,601,452 B2* | 12/2013 | Krasnoiarov | G06F 9/45516 717/146 |
| 8,682,812 B1 | 3/2014 | Ranjan | |
| 9,436,507 B2 | 9/2016 | Mishra et al. | |
| 2004/0199896 A1 | 10/2004 | Goodman et al. | |
| 2006/0095893 A1 | 5/2006 | Vahid et al. | |
| 2007/0073753 A1 | 3/2007 | Baikov | |
| 2007/0124688 A1 | 5/2007 | Nauerz et al. | |
| 2007/0168402 A1 | 7/2007 | Mehra et al. | |
| 2009/0220696 A1 | 9/2009 | Chung et al. | |
| 2009/0228896 A1 | 9/2009 | Meijer et al. | |
| 2009/0288065 A1 | 11/2009 | Nathan et al. | |
| 2009/0300404 A1 | 12/2009 | Branson et al. | |
| 2010/0083281 A1 | 4/2010 | Malladi et al. | |
| 2012/0158623 A1 | 6/2012 | Bilenko et al. | |
| 2013/0091557 A1 | 4/2013 | Gurrapu | |
| 2013/0317803 A1 | 11/2013 | Manley et al. | |
| 2014/0040170 A1 | 2/2014 | Zheng et al. | |
| 2014/0046696 A1 | 2/2014 | Higgins et al. | |
| 2014/0053261 A1 | 2/2014 | Gupta et al. | |
| 2014/0101076 A1 | 4/2014 | Martin et al. | |
| 2014/0180738 A1 | 6/2014 | Phillipps et al. | |
| 2014/0244552 A1 | 8/2014 | Liu et al. | |
| 2016/0011905 A1 | 1/2016 | Mishra et al. | |
| 2016/0012318 A1 | 1/2016 | Bilenko et al. | |

OTHER PUBLICATIONS

Data structures Advanced R; Aug. 23, 2013.*
Enum Types (The Java™ Tutorials _ Learning the Java Language _ Classes and Objects); Nov. 14, 2011.*
Morandat, F., Hill, B., Osvald, L., & Vitek, J; Evaluating the design of the R language. In European Conference on Object-Oriented Programming; Jun. 2012; Springer Berlin Heidelberg; pp. 104-131.*
Working with missing data—pandas 0.7; Feb. 13, 2012.*
.NET Extensible Objects; Apr. 18, 2014.*
Cleary, Andrew, et al. Language interoperability mechanisms for high-performance scientific applications. No. UCRL-JC-131823. Lawrence Livermore National Laboratory (LLNL), Livermore, CA, 1998.*
Bunch, et al., "MEDEA: A Pluggable Middleware System for Interoperable Program Execution Across Cloud Fabrics", Retrieved on: Jul. 24, 2014 Available at: https://nidhogg.cs.ucsb.edu/research/tech_reports/reports/2012-11.pdf.
Patel, et al., "A Platform for Parallel R-based Analytics on Cloud Infrastructure", In 41st International Conference on Parallel Processing Workshops, Sep. 10, 2012, 6 pages.
Sehgal, et al., "Understanding Application-Level Interoperability: Scaling-Out MapReduce Over High-Performance Grids and Clouds", In Journal Future Generation Computer Systems, vol. 27, Issue 5, May 1, 2011, 14 pages.
Marozzo, et al., "Enabling cloud interoperability with COMPSs", In Proceedings of 18th International Conference, Euro-Par, Aug. 27, 2012, 12 pages.

"Renjin—The R prlgramming language on the JVM", Published on: Jul. 21, 2013 Available at: http://www.renjin.org/.
"Cloudify", Published on: Apr. 16, 2014 Available at: http://getcloudify.org/about_us.html.
Ooms, Jeroen., "The OpenCPU System: Towards a Universal Interface for Scientific Computing through Separation of Concerns", In Proceedings of the Computing Research Repository, Jun. 19, 2014, 23 pages.
Lordan, et al., "ServiceSs: an interoperable programming framework for the Cloud", In Journal of Grid Computing, vol. 12, Issue 1, Mar. 2013, 20 pages.
"Alteryx and Revolution Analytics", Retrieved from «http://www.alteryx.com/sites/default/files/resources/files/alt-revo-ds.pdf», Retrieved on: Jul. 24, 2014, 2 Pages.
"Getting Started with Google BigQuery", Retrieved from «https://cloud.google.com/files/articles/google-cloud_technical-article_bigquery.pdf», Retrieved on: Jul. 24, 2014, 10 Pages.
"Hybrid Analytics", Retrieved from «http://web.archive.org/web/20140703085106/http://atigeo.com/technology/analytics/», Retrieved on: Jul. 25, 2014, 9 Pages.
"Adaptive Featurization as a Service", Application as Filed in U.S. Appl. No. 14/576,253, filed Dec. 19, 2014, 19 Pages.
"Composing and Executing Workflows Made Up of Functional Pluggable Building Blocks", Application as Filed in U.S. Appl. No. 14/576,256, filed Dec. 19, 2014, 28 Pages.
Ambite, et al., "Automatically Composing Data Workflows with Relational Descriptions and Shim Services", In the Proceedings of the 6th International Semantic Web Conference, Nov. 11, 2007, pp. 15-29.
Bellosta, Carlos J. Gil, "Package 'rPython': Package Allowing R to Call Python", Retrieved from «https://web.archive.org/web/20140213201443/http://cran.r-project.org/web/packages/rPython/rPython.pdf>, Sep. 8, 2013, 7 Pages.
Brownlee, Jason, "Best Programming Language for Machine Learning—Machine Learning Mastery", Retrieved from «http://machinelearningmastery.com/best-programming-language-for-machine-learning/», May 10, 2014, 9 Pages.
Fania, et al., "Predictive Analytics and Interactive Queries on Big Data", In White Paper Intel Reference Architecture Big Data Analytics, Retrieved on: Jul. 24, 2014, 11 Pages.
Hakim, et al, "Architecting a Machine Learning System for Risk", Retrieved from «http://nerds.airbnb.com/architecting-machine-learning-system-risk/», Jun. 16, 2014, 16 Pages.
Hall, et al., "The WEKA Data Mining Software: An Update", In Proceeding of the ACM SIGKDD Explorations Newsletter, vol. 11, Issue 1, Jul. 2009, pp. 10-18.
Jakimovski, et al., "Framework for Workflow Gridication of Genetic Algorithms in Java", In Proceedings of the 8th International Conference on Computational Science, Part III, Jun. 23, 2008, pp. 463-470.
Lin, et al., "A Task Abstraction and Mapping Approach to the Shimming Problem in Scientific Workflows", In IEEE International Conference on Services Computing, Sep. 21, 2009, pp. 284-291.
Rozsnyai, et al., "Business Process Insight: An Approach and Platform for the Discovery and Analysis of End-to-End Business Processes", In Annual of the Service Research and Innovation Institute Global Conference, Jul. 24, 2012, pp. 80-89.
"International Search Report and Written Opinion Issued in PCT Patent Application No. PCT/US2015/039837", dated Sep. 25, 2015, 12 Pages.
"International Search Report and Written Opinion Issued in PCT Patent Application No. PCT/US2015/039838", dated Oct. 20, 2015, 11 Pages.
Krishnaswamy, Jayaram, "Azure ML: Predictive analytics as a Service (PaaaS?)", Published on: Jul. 15, 2014, 9 pages, Available at: http://bigdata.sys-con.com/node/3122578.
"International Search Report & Written Opinion Issued in PCT Application No. PCT/US2015/039837", dated Sep. 25, 2015, 12 Pages.
"Hybrid Analytics", Retrieved on: Jul. 25, 2014, Available at: http://atigeo.com/technology/analytics/.

(56) References Cited

OTHER PUBLICATIONS

Krishnaswamy, Jayaram, "Azure ML: Predictive analytics as a Service (PaaaS?)", Published on: Jul. 15, 2014, Available at: http://bigdata.sys-con.com/node/3122578.
"Composing and Executing Workflows Made Up of Functional Pluggable Building Blocks", Application as filed in U.S. Appl. No. 14/576,256, dated Dec. 19, 2014, 28 Pages.
"Adaptive Featurization as a Service", Application as filed in U.S. Appl. No. 14/576,253, dated Dec. 19, 2014, 19 Pages.
Ambite, et al., "Automatically Composing Data Workflows with Relational Descriptions and Shim Services", In the Semantic Web of the series Lecture Notes in Computer Science, vol. 4825, Nov. 11, 2007, pp. 15-29.
Hakim, Naseem , "Architecting a Machine Learning System for Risk", Retrieved on: Jul. 24, 2014, Available at: http://nerds.airbnb.com/architecting-machine-learning-system-risk/.
Jakimovski, et al., "Framework for Workflow Gridication of Genetic Algorithms in Java", In Lecture Notes in Computer Science of Computational Science,vol. 5103, Jun. 23, 2008, pp. 463-470.
"Getting Started with Google BigQuery", Retrieved on: Jul. 24, 2014 Available at: https://cloud.google.com/files/articles/google-cloud_technical-article_bigquery.pdf.
"Alteryx and Revolution Analytics", Retrieved on: Jul. 24, 2014. Available at: http://www.alteryx.com/sites/default/files/resources/files/alt-revo-ds.pdf.
Rozsnyai, et al., "Business Process Insight: An Approach and Platform for the Discovery and Analysis of End-to-End Business Processes", In Proceeding of SRII Global Conference (SRII), Jul. 24, 2012, pp. 80-89.
Fania, et al., "Predictive Analytics and Interactive Querieson Big Data", In White Paper Intel Reference Architecture Big Data Analytics, Retrieved on: Jul. 24, 2014, 11 pages.
Hall, et al., "The WEKA Data Mining Software: An Update", In ACM SIGKDD Explorations Newsletter, vol. 11, Issue 1, Jun. 2009, pp. 10-18.
Jiang, et al., "Similarity-Based Online Feature Selection in Content-Based Image Retrieval", In Proceedings of IEEE Transactions on Image Processing, vol. 15, Issue 3, Mar. 31, 2006, 11 Pages.
Yu, et al., "Feature Selection for High-Dimensional Data: A Fast Correlation-Based Filter Solution", In Proceedings of the Twentieth International Conference on Machine Learning, Aug. 21, 2003, pp. 856-863.
"International Search Report and Written Opinion Issued in PCT Patent Application No. PCT/US2015/039839", dated Nov. 26, 2015, 13 Pages.
U.S. Appl. No. 14/576,256, Office Action dated Dec. 15, 2015, 6 pages.
PCT Application No. PCT/US2015/39838, Chapter II Demand, Amendments and Letter Accompanying the Amendment, dated Feb. 3, 2016, 16 pages.
PCT Application No. PCT/US2015/039830, Chapter II Demand and Demand for an International Preliminary Examination According to Article 31 PCT, dated Feb. 29, 2016, 17 pages.
Notice of Allowance dated May 10, 2016 in U.S. Appl. No. 14/576,256, 6 pages.
"Second Written Opinion Issued in PCT Application No. PCT/US2015/039838", dated Jul. 4, 2016, 6 Pages.
"Second Written Opinion Issued in PCT Application No. PCT/US2015/039839", dated Jun. 23, 2016, 7 Pages.
Non-Final Office Action dated Dec. 15, 2016 in U.S. Appl. No. 14/576,256, 6 pages.
Mishra Debi et al.; "Composing and Executing Workflows Made Up of Functional Pluggable Building Blocks"; U.S. Appl. No. 15/253,251, filed Aug. 31, 2016; 29 pages.
"International Preliminary Report on Patentability in PCT Application No. PCT/US2015/039839", dated Sep. 28, 2016, 14 Pages.
"International Preliminary Report on Patentability in PCT Application No. PCT/US2015/039838", dated Oct. 7, 2016, 13 Pages.
Non-Final Office Action dated Nov. 15, 2016 in U.S. Appl. No. 14/576,253, 7 pages.
"International Preliminary Report on Patentability in PCT Application No. PCT/US2015/039837", dated Jan. 26, 2017, 9 Pages.
Final Office Action dated Sep. 14, 2017 in U.S. Appl. No. 14/576,253, 14 pages.
Restriction Requirement dated Apr. 25, 2017 in U.S. Appl. No. 14/576,253, 6 pages.
Non-Final Office Action dated Mar. 8, 2018 in U.S. Appl. No. 15/253,251, 11 pages.

* cited by examiner

INTEROPERABLE MACHINE LEARNING PLATFORM

CROSS-REFERENCE TO RELATED APPLICATIONS

This application claims the benefit of U.S. Provisional Patent Application No. 62/023,835 entitled "INTEROPERABLE MACHINE LEARNING PLATFORM" filed Jul. 12, 2014, which is hereby incorporated by reference in its entirety.

BACKGROUND

Instead of just following explicitly programmed instructions, some computing systems can learn by processing data. The process whereby a computing system learns is called machine learning (ML). Machine learning can be advantageously employed wherever designing and programming explicit, rule-based algorithms for data computation is insufficient. Machine learning often is based on a statistical mathematical model. A mathematical model describes a system using mathematical concepts and language. A mathematical model is often used to make predictions about future behavior based on historical data.

SUMMARY

A machine learning platform that is interoperable with other existing external programming language environments is described. Other program language environments include but are not limited to open source environments (e.g., R, Python, etc.). Interoperability between data formats, metadata schema and interfaces to machine learning (ML) functions and trained machine learning models can be provided with no loss of information. A mechanism for extending support to additional programming language environments can be provided. Developers and data scientists can compose workflows in the absence of conversion coding where the workflows include multiple stages of complex computations on data and data flow. Computations can include ingesting data, transforming data, creating optimizers, and/or applying machine learning algorithms. Composed workflows can be automatically operationalized and published as a web service even when the web service includes the use of programming languages not supported by the platform. Translation of data formats, metadata schema and interfaces to machine learning (ML) functions can occur transparently in the background so that the platform can respond to applications coded in the external programming language or languages without the need for a user to perform translation programming. Program assets that currently exist in external programming languages can be used without reprogramming. One module can consume the outputs of an upstream module, even when the consumed or consuming module is a third party execution environment module (e.g., such as an R module, Python module, etc.).

Existing programming languages including but not limited to R or Python can be supported so that a user can add his own software (e.g., data transformation algorithms) written in R or Python or in any other programming language to enable external pre-existing program assets to be used to extend capabilities of the platform. The platform and runtime environment described herein can automatically recognize and provide extensibility via a bi-directional data and schema translation mechanism. Programs can be directly plugged into other building block components. A developer or other user does not have to write any data format translation code to make the program functional. Software in external programming languages can be accessed and can be composed with other algorithms provided by the interoperable machine learning platform described herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

There is little interoperability among machine learning tools today. Existing interoperability between different ML systems is not refined and is lossy. The data types are often incompatible. ML-specific schema including but not limited to metadata about what the features, labels and scores are, is often lost in translation. Some ML tools are proprietary, some are Open Source. Popular scripting languages in which ML tools have been written are JAVA, R and Python. Other tools are written in other programming languages. Today there is no easy way to use these tools within the same project. It would be useful to be able to compose ML workflows that can use tools written in several different third party execution environment programming languages. A Predictive Analytics Platform (e.g., a machine learning product) as described herein can be an extensible, cloud-based, multi-tenant service for authoring and executing (experimenting and producing) data science workflows. One capability of the platform described herein is the functional composition and execution of arbitrarily complex workflows with data manipulation and computation functionality using a drag and connect paradigm. A composed workflow (called an experiment) can be executed on datasets. Experimentation can continue until a desired result is achieved.

The composed workflow can be published as an operational web service as a REST (representational state transfer) end point on a cloud computing platform such as but not limited to Microsoft's Azure ML. A REST API (application programming interface) is a public URL that can be entered into a browser's address line. It contains no state so that any data needed to produce output is in the URL itself. The interface is abstracted so that the user does not need to know any specific technology in order to communicate with it. This can enable a user such as but not limited to a developer or data scientist to author their workflows using a simple drag and connect paradigm. The workflows can be tested and provided as production web services without the user having to write any code. This capability can be enabled by an architectural design such as the AFx (Analytics Framework and Platform architecture). In accordance with aspects of the subject matter described herein, an extensible plug-n-play capability with third party execution environments such as but not limited to R, Python, JAVA and so on are provided. Any third party execution environment can be supported.

To run an experiment, the application can send the experiment graph (e.g., a composed workflow) to the job execution scheduler (JES). The experiment graph can include the dependency structure (which controls the order of execution) along with pointers to the code and data needed at each graph node. The JES can then schedule execution of each graph node at a resource. Status information can be communicated back to the application to be displayed.

Interoperable Machine Learning Platform

Figure 1A:
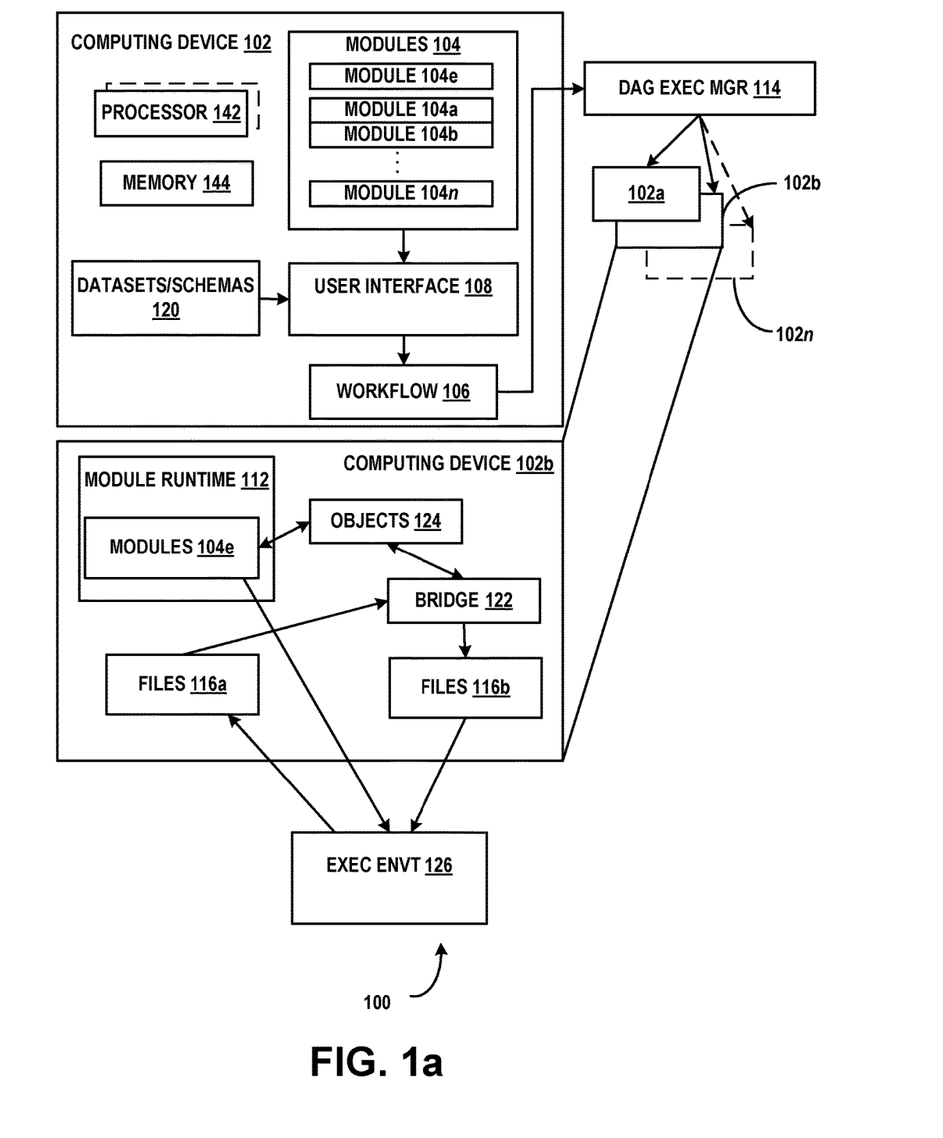
FIG. 1a illustrates an example 100 of an interoperable machine learning platform in accordance with aspects of the subject matter described herein.

FIG. 1a illustrates an example of a system 100 comprising an interoperative predictive analytics/machine learning platform in accordance with aspects of the subject matter disclosed herein. System 100 or portions thereof may include information obtained from a service (e.g., in the cloud) or may operate in a cloud computing environment. A cloud computing environment can be an environment in which computing services are not owned but are provided on demand. For example, information may reside on multiple devices in a networked cloud and/or data can be stored on multiple devices within the cloud.

System 100 can include one or more computing devices such as, for example, computing device 102. Contemplated computing devices include but are not limited to desktop computers, tablet computers, laptop computers, notebook computers, personal digital assistants, smart phones, cellular telephones, mobile telephones, and so on. A computing device such as computing device 102 can include one or more processors such as processor 142, etc., and a memory such as memory 144 that communicates with the one or more processors.

System 100 may include any one or any combination of: one or more pluggable modules such as module 104e, etc., and/or a bridge such as bridge 122 that can translate data formats and, ML-specific metadata. Modules such as module 104e can be a standard functional component that meets specified design patterns, data interface standards, input/output data types, and parameter specifications. Modules such as module 104e can enable interoperability with third party execution environments.

In the interoperable machine learning platform represented in system 100, a user can employ a drag and connect paradigm in a user interface (e.g., user interface 108) to select and connect modules such as some combination of modules from a module library 104. Modules 104 can include a number of modules such as, for example, module 104a, module 104b . . . module 104n. Modules in the module library 104 can include one or more third party execution environment modules. Modules such as module 104e can enable interoperability between a first machine learning execution environment executing in a first programming language and a second execution environment executing in a second programming language without reprogramming. Modules such as module 104e can enable interoperability with third party execution environments. Inputs to the module can be specified. Outputs from the module can be specified. Input can be data over which the module will compute. Data can include one or more datasets and/or schemas such as datasets/schemas 120. Data can be objects such as but not limited to DataTable objects. Such an object, which is a representation of two-dimensional tabular data and its corresponding schema, can be a type of representation used by the interoperative machine learning platform. Input can be parameters for the module. Parameters can be programming code in the external programming language (e.g., an R script). Parameters can be, for example, a script in an external programming language such as R, Python, or any other suitable programming language. Output can be results of the computations on the data. The selected modules can be composed to create a workflow such as workflow 106. Thus workflow 106 can include a number of tasks.

When the workflow is executed, the Directed Acyclic Graph (DAG) execution manager such as DAG execution manager 114 can schedule the tasks to execute on one or more computing resources such as computing resource 102a, computing resource 102b . . . to computing resource 102n. Computing resources can be computing devices, virtual machines, and so on. A module such as module 104e executing on a computing resource can execute in a module execution environment or module runtime such as module runtime 112. The module execution runtime (e.g., module runtime 112) can abstract away details such as input and output file location and format by converting input files into standardized types such as DataTable types, parsing the rest of the arguments, calling the module, then serializing output objects into files. Input to the third party execution environment module can be in the form of files 116a. A bridge such as bridge 122 can convert the files into objects such as objects 124 (e.g., DataTable objects) and can send the objects to module 104e. The module 104e can communicate over a third party execution environment bridge such as bridge 122 to a third party execution environment such as execution environment 126. The bridge can be an interoperative module that facilitates interoperability with existing tools and languages. The third party execution environment bridge can convert data on which the program code operates to the format that the external programming language execution environment expects. The program code can be passed to the execution environment 126 along with files 116b. The third party execution environment can then execute the code and return the results to bridge 122 in the form of files 116a. The DAG execution manager can be notified of the results. The DAG execution manager can wait until all the scheduled tasks are done before sending back success for the entire workflow.

Thus, modules can receive input such as data and a schema for the data. The schema can be standardized so that functional components of system 100 can interpret and/or modify the schema. The data and its corresponding schema can be incorporated into a standardized object. The object can provide the data connection plug-in between modules. The objects can provide plugability of a spectrum of data types and schema into the standard object interface. A DAG (directed acyclic graph) execution manager such as DAG execution manager 114 can parse any workflow. DAG execution manager 114 can use a module runtime such as module runtime 112 to execute it. System 100 can include one or more interoperability modules such as bridge 122 that facilitate interoperability with existing tools and languages, The module execution runtime (e.g., module runtime 112) can abstract away details such as input and output file location and format by converting input files into DataTable types, parsing the rest of the arguments, calling the module, then serializing output objects into files.

One non-limiting example of an R Script is:

```
1 # Map1-based optional input ports to variables
2 dataset1=maml.mapinputPort(1) # class: data.frame
3 dataset2=maml.mapinputPort(2) # class: data.frame
4 dataset=rbind(dataset1, dataset2);
5 plot(data.set);
6 maml.mapOutputPort("data.set");
```

Line 1 is a comment. Line 2 of the above code indicates that Dataset1 is to be assigned to whatever is attached to the first input port. Line 3 indicates that Dataset2 is to be assigned to whatever is attached to the second input port. Line 4 appends the second dataset to the first dataset. Line 5 plots the data. Line 6 returns the output data set. A user may have provided the R script above. Thus the interoperative machine learning platform described can provide a built-in module to include R script into any experiment workflow.

R script can be included into an experiment workflow by mapping the R schema into the Data Table schema. For example, all categorical column types of R Type Factor can be converted into categorical by taking the value and calling ToString on it. OD (object dense array), ND (numeric dense array), SV (sparse vector) and MV (Missing Values Array) are converted to less than 32-bit size fields of R Type Logical can be converted to Boolean. OD,ND,SV,MV less than 32 bit size of R Type Integer can be signed and converted. OD,ND,SV,MV greater than 32 bit size of R Type Numeric can be signed and converted to double precision floating point. OD,SV,MV<string> of R Type Character can be straightened to a string, OD,SV,MV<Complex> of R Type Complex can be converted. OD,SV,MV<DateTime> of R Type Date→Date can be converted and all other types can be thrown, meaning that any type that is not recognized can be gracefully handled as an error in the software rather than as a runtime error.

Figure 1B:
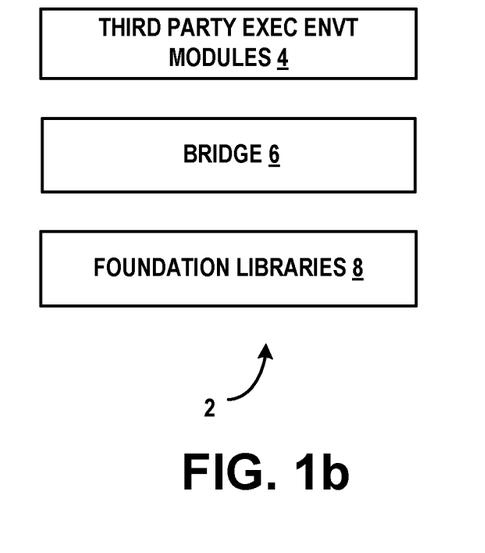
FIG. 1b illustrates a more detailed example of a portion of the architecture of FIG. 1a. in accordance with aspects of the subject matter disclosed herein.

FIG. 1b illustrates one non-limiting example of an architectural layering diagram 2 showing how software can be layered in the interoperable machine learning platform in accordance with aspects of the subject matter described herein. The top layer can include third party execution environment modules 4. These modules can issue calls to third party execution environments such as, for example, to an R execution environment, etc. so that processing is performed in the external programming language but to the interoperable machine learning platform these modules look identical to modules that execute in the programming language in which the interoperable machine learning platform software is written. In accordance with aspects of the subject matter described herein, the second layer can include conversion software called programming language bridges 6. The programming language bridges can convert abstract two-dimensional tabular data in a format that the machine learning platform can process into a format that the third party execution environment can process and vice versa. The next layer can include foundational executables 8 that perform lower level operations.

Figure 1C:
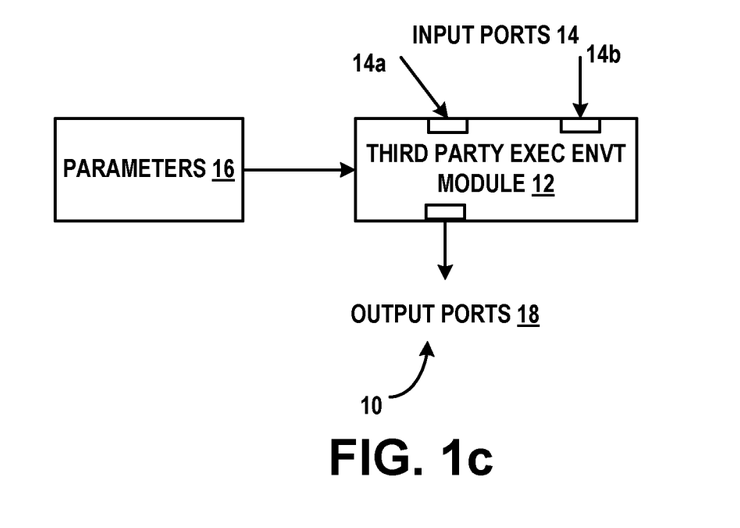
FIG. 1c illustrates an example of data flow in a portion of the platform of FIG. 1a in accordance with aspects of the subject matter disclosed herein.

FIG. 1c illustrates an example 10 of elements of a module that can be exposed to a user. The third party programming language execution environment module 12 can include program code that is written in a programming language that is not the language in which the platform executes. One or more input ports 14 such as input port 14a and input port 14b can be exposed to the user to enable the user to select data to be processed by the third party execution environment module 12. Output port 18 enables the user to select where the output of the third party programming language execution environment module 12 goes. Parameters 16 can include the programming code written in the third party programming language.

Figure 2A:
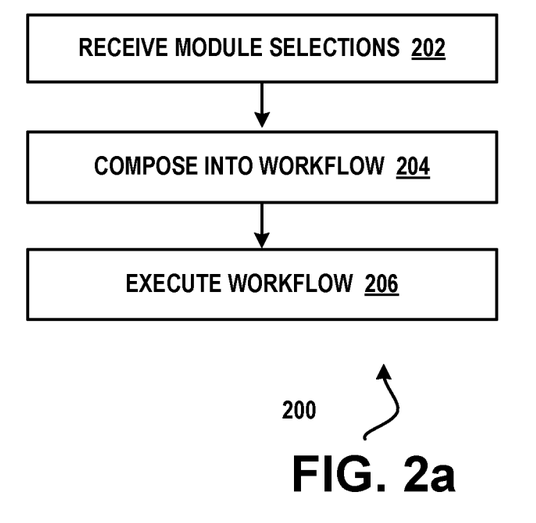
FIG. 2a illustrates an example of a method 200 comprising a method of interoperability composing and executing workflows in accordance with aspects of the subject matter disclosed herein.

FIG. 2a illustrates an example of a method 200 for interoperably composing and executing workflows in accordance with aspects of the subject matter described herein. The method described in FIG. 2a can be practiced by a system such as but not limited to the one described with respect to FIG. 1. While method 200 describes a series of operations that are performed in a sequence, it is to be understood that method 200 is not limited by the order of the sequence depicted. For instance, some operations may occur in a different order than that described. In addition, one operation may occur concurrently with another operation. In some instances, not all operations described are performed.

Figure 2B:
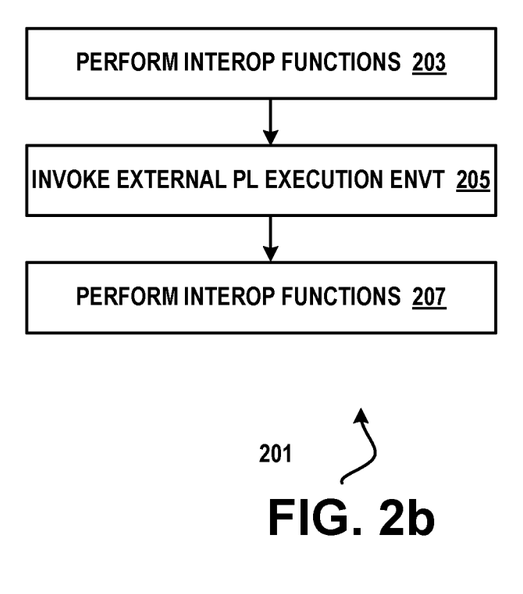
FIG. 2b illustrates an example of a method 201 comprising more detail about a portion of method 200 in accordance with aspects of the subject matter disclosed herein.

At operation 202, a selection of modules and their associated parameters can be received. At operation 204 the modules can be composed into a workflow. At operation 206 a workflow can be executed. The method described in FIG. 2a can be practiced by a system such as but not limited to the one described with respect to FIGS. 1a-1c. FIG. 2b is a more detailed description 201 of the execute workflow operation portion of method 200. While method 201 describes a series of operations that are performed in a sequence, it is to be understood that method 201 is not limited by the order of the sequence depicted. For instance, some operations may occur in a different order than that described. In addition, one operation may occur concurrently with another operation. In some instances, not all operations described are performed. At operation 203 interop functions can be performed as described more fully above. For example, data can be converted into a form that R can process. At operation 205 an external programming language execution environment can be invoked, using the module parameters. At operation 207 a second set of interop functions can be performed.

Described herein is a system comprising at least one processor, a memory connected to the at least one processor and at least one program module providing interoperability between a first machine learning execution environment executing in a first programming language and a second execution environment executing in a second programming language wherein the interoperability enables existing tools written in the second programming language to be used in the first machine learning execution environment without reprogramming. The system can include at least one program module that translates a machine learning-specific schema associated with the first machine learning execution environment to a schema associated with the second execution environment without loss of information. The system can include at least one program module that translates a machine learning-specific schema associated with the second execution environment to a schema associated with the first machine learning execution environment without loss of information. The second programming language can be one of R, JAVA or Python. An R factor data type associated with the second programming language can be converted to a categorical data type associated with the first programming language. An R missing value type associated with the second programming language can be converted to a missing value associated with the first programming language. Machine-learning specific metadata is not lost when execution passes from one execution environment to a second execution environment. Machine-learning schema can be metadata about feature columns, labels, scores and weights.

Described is a method that provides interoperability between a first machine learning execution environment executing in a first programming language and a second execution environment executing in a second programming language wherein the interoperability enables existing tools written in the second programming language to be used in the first machine learning execution environment without reprogramming. The programming language of the second execution environment can be R. The programming language of the second execution environment can be Python. The programming language of the second execution environment can be JAVA. The data types of the programming language of the second execution environment can be converted into .NET data types in accordance with an extensible data table.

Described is a computer-readable storage medium comprising computer-readable instructions which when executed cause at least one processor of a computing device to enable existing tools in a plurality of programming languages to be used automatically without conversion coding in a machine learning execution environment. Other instructions map a scripting language schema of a first programming language to a schema in a data table in a second programming language. Other instructions can map a scripting language schema to a schema in a data table in a machine learning execution environment, wherein the scripting language is R. Other instructions can map a scripting language schema to a schema in a data table in a machine learning execution environment, wherein the scripting language is Python. Other instructions can map a scripting language schema to a schema in a data table in a machine learning execution environment, wherein the data table is extensible. Other instructions can map a scripting language schema to a schema in a data table in a machine learning execution environment, wherein the data types of the scripting language are converted into .NET data types in accordance with an extensible data table. Other instructions can wrap the scripting language code in a .NET wrapper.

Example of a Suitable Computing Environment

Figure 3:
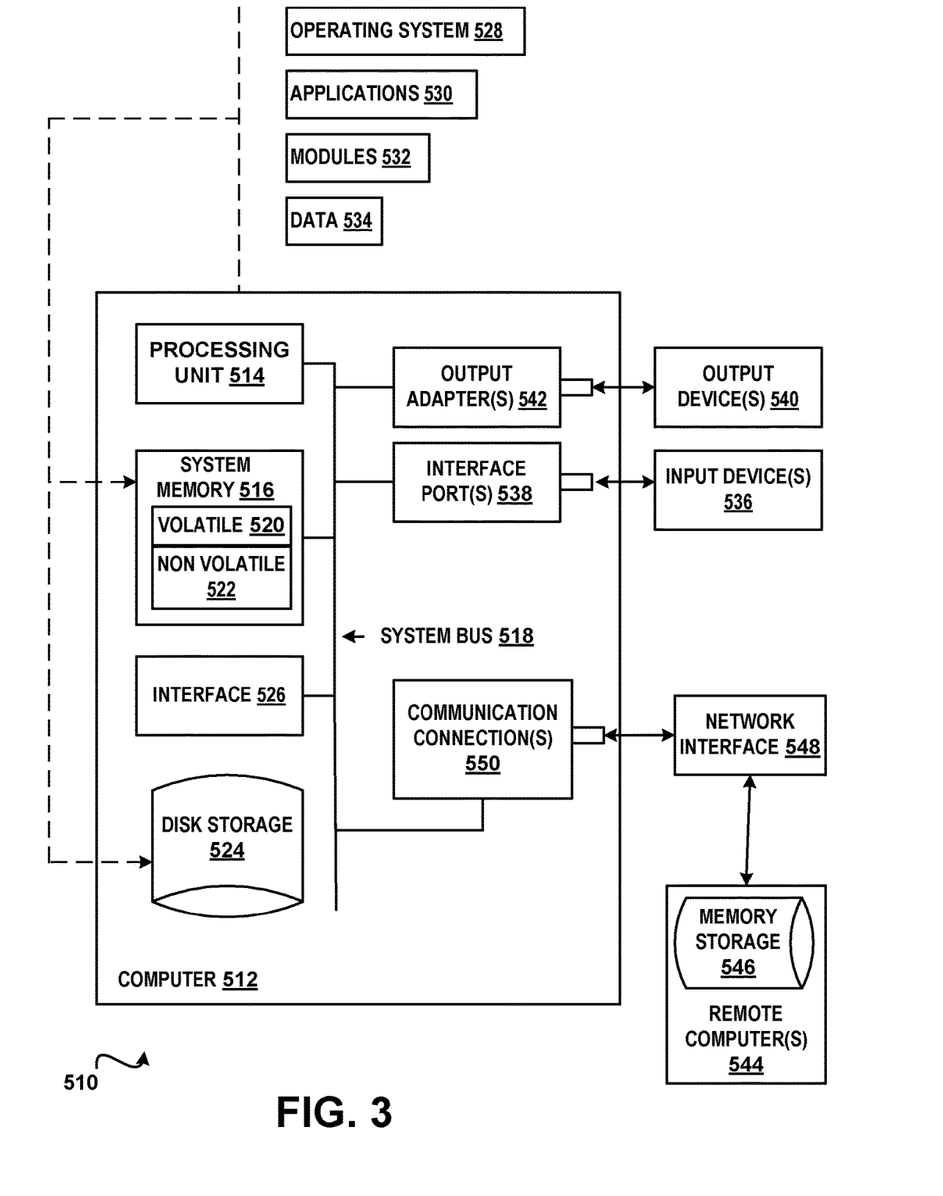
FIG. 3 is a block diagram of an example of a computing environment in accordance with aspects of the subject matter disclosed herein.

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include at least one processing unit 514, a system memory 516, and a system bus 518. The at least one processing unit 514 can execute instructions that are stored in a memory such as but not limited to system memory 516. The processing unit 514 can be any of various available processors. For example, the processing unit 514 can be a graphics processing unit (GPU). The instructions can be instructions for implementing functionality carried out by one or more components or modules discussed above or instructions for implementing one or more of the methods described above. Dual microprocessors and other multiprocessor architectures also can be employed as the processing unit 514. The computer 512 may be used in a system that supports rendering graphics on a display screen. In another example, at least a portion of the computing device can be used in a system that comprises a graphical processing unit. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures. Computer 512 may include a data store accessible by the processing unit 514 by way of the system bus 518. The data store may include executable instructions, 3D models, materials, textures and so on for graphics rendering.

Computer 512 typically includes a variety of computer readable media such as volatile and nonvolatile media, removable and non-removable media. Computer readable media may be implemented in any method or technology for storage of information such as computer readable instructions, data structures, program modules or other data. Computer readable media include computer-readable storage media (also referred to as computer storage media) and communications media. Computer storage media includes physical (tangible) media, such as but not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices that can store the desired data and which can be accessed by computer 512. Communications media include media such as, but not limited to, communications signals, modulated carrier waves or any other intangible media which can be used to communicate the desired information and which can be accessed by computer 512.

It will be appreciated that FIG. 3 describes software that can act as an intermediary between users and computer resources. This software may include an operating system 528 which can be stored on disk storage 524, and which can allocate resources of the computer 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, voice recognition and gesture recognition systems and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection(s) 550. Network interface 548 encompasses communication networks such as local area networks (LANs) and wide area networks (WANs) but may also include other networks. Communication connection(s) 550 refers to the hardware/software employed to connect the network interface 548 to the bus 518. Communication connection(s) 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. As used herein, the term "machine-readable storage medium" shall be taken to exclude any mechanism that provides (i.e., stores and/or transmits) any form of propagated signals. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computing device, comprising:
   at least one processor, and a memory connected to the at least one processor, wherein the at least one memory and the at least one processor are respectively configured to store and execute instructions for causing the computing device to perform operations, the operations comprising:
   receiving one or more modules of a machine learning workflow;
   composing the one or more received modules of the machine learning workflow into at least a portion of a machine learning application; and
   processing a machine learning dataset with the composed machine learning application, the processing of the machine learning dataset including:
   automatically interfacing the dataset, at runtime, between a first execution environment configured to execute machine learning code in a first programming language and a second execution environment configured to execute code written in a second programming language; and
   interfacing metadata schema, at runtime, between the first execution environment configured to execute the machine learning code in the first programming language and the second execution environment configured to execute the code written in the second programming language.

2. The computing device of claim 1, wherein interfacing the metadata schema comprises:
   translating a machine learning-specific schema for the first execution environment to a schema for the second execution environment without loss of information.

3. The computing device of claim 1, wherein interfacing the metadata schema comprises:
   translating a machine learning-specific schema associated with the second execution environment to a schema associated with the first machine learning execution environment without loss of information.

4. The computing device of claim 1, wherein the second programming language is at least one of R, JAVA, or Python.

5. The computing device of claim 4, wherein the operations further comprise:
   converting an R factor data type associated with the second programming language to a categorical data type associated with the first programming language.

6. The computing device of claim 4, wherein the operations further comprise:
   converting an R missing value type associated with the second programming language to a missing value associated with the first programming language.

7. The computing device of claim 3, wherein the machine-learning specific metadata is not lost when execution passes from the first execution environment to the second execution environment.

8. The computing device of claim 3, wherein the machine-learning schema comprises metadata about feature columns, labels, scores, and weights.

9. A method, comprising:
receiving one or more modules of a machine learning workflow;
composing the one or more received modules of the machine learning workflow into at least a portion of a machine learning application; and
processing a machine learning dataset with the composed machine learning application, the processing of the machine learning dataset including:
automatically interfacing the dataset, at runtime, between a first execution environment configured to execute machine learning code in a first programming language and a second execution environment configured to execute code written in a second programming language; and
interfacing metadata schema, at runtime, between the first execution environment configured to execute the machine learning code in the first programming language and the second execution environment configured to execute the code written in the second programming language.

10. The method of claim 9, wherein the second programming language is R.

11. The method of claim 9, wherein the second programming language is Python.

12. The method of claim 9, wherein the second programming language is JAVA.

13. The method of claim 9, further comprising:
converting data types of the second programming language of the second execution environment into .NET data types in accordance with an extensible data table.

14. A method, including:
composing the one or more modules of a machine learning workflow into at least a portion of a machine learning application;
automatically interfacing a machine learning dataset, while processing the machine learning dataset with the composed machine learning application running on an interoperability platform, between a first execution environment configured to execute machine learning code in a first language for the composed machine learning application and a second execution environment configured to execute code written in a second language for the composed machine learning application; and
automatically interfacing metadata, while processing the machine learning dataset with the composed machine learning application running on the interoperability platform, between the first execution environment configured to execute the machine learning code in the first language for the composed machine learning application and the second execution environment configured to execute the code written in the second language for the composed machine learning application.

15. The method of claim 14, further comprising:
mapping a scripting language schema of the first language to a schema in a data table in the second language.

16. The method of claim 14, further comprising:
mapping a scripting language schema to a schema in a data table in a machine learning execution environment, wherein the scripting language is R.

17. The method of claim 14, further comprising:
mapping a scripting language schema to a schema in a data table in a machine learning execution environment, wherein the scripting language is Python.

18. The method of claim 14, further comprising
mapping a scripting language schema to a schema in a data table in a machine learning execution environment, wherein the data table is extensible.

19. The method of claim 14, further comprising:
mapping a scripting language schema to a schema in a data table in a machine learning execution environment, wherein the data types of the scripting language are converted into .NET data types in accordance with an extensible data table.

20. The method of claim 14, further comprising:
wrapping the scripting language code in a .NET wrapper.

* * * * *